(12) United States Patent
Li et al.

(10) Patent No.: US 11,183,105 B2
(45) Date of Patent: Nov. 23, 2021

(54) DISPLAY PANEL AND DEVICE, IMAGE PROCESSING METHOD AND DEVICE, AND VIRTUAL REALITY SYSTEM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Xi Li, Beijing (CN); Yuanjie Lu, Beijing (CN); Jinghua Miao, Beijing (CN); Bin Zhao, Beijing (CN); Xuefeng Wang, Beijing (CN); Yukun Sun, Beijing (CN); Jianwen Suo, Beijing (CN); Qingwen Fan, Beijing (CN); Wenyu Li, Beijing (CN); Jinbao Peng, Beijing (CN); Zhifu Li, Beijing (CN); Lili Chen, Beijing (CN); Jiankang Sun, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/963,410

(22) PCT Filed: Dec. 24, 2019

(86) PCT No.: PCT/CN2019/127831
§ 371 (c)(1),
(2) Date: Jul. 20, 2020

(87) PCT Pub. No.: WO2020/140794
PCT Pub. Date: Jul. 9, 2020

(65) Prior Publication Data
US 2020/0342805 A1 Oct. 29, 2020

(30) Foreign Application Priority Data

Jan. 2, 2019 (CN) .......................... 201910001482.5

(51) Int. Cl.
*G09G 3/20* (2006.01)
*G06F 3/01* (2006.01)

(52) U.S. Cl.
CPC ........... *G09G 3/2092* (2013.01); *G06F 3/011* (2013.01); *G09G 2310/027* (2013.01)

(58) Field of Classification Search
None
See application file for complete search history.

(56) References Cited

U.S. PATENT DOCUMENTS

2013/0278488 A1 10/2013 Huo
2016/0232876 A1 8/2016 Kim et al.
(Continued)

FOREIGN PATENT DOCUMENTS

CN 101593469 A 12/2009
CN 102645779 A 8/2012
(Continued)

OTHER PUBLICATIONS

First Office Action dated Apr. 14, 2020, relating to CN Patent Application No. 201910001482.5.
(Continued)

*Primary Examiner* — Aneeta Yodichkas
(74) *Attorney, Agent, or Firm* — Dinsmore & Shohl LLP (57) ABSTRACT

The present disclosure provides a display panel and device, an image processing method and device, and a virtual reality system. The display panel includes: a first display area; and at least one second display area surrounding the first display area, a number of sub-pixels per unit area in the first display
(Continued)

area being greater than a number of sub-pixels per unit area in the at least one second display area.

19 Claims, 4 Drawing Sheets

(56) References Cited

U.S. PATENT DOCUMENTS

| | | | |
|---|---|---|---|
| 2017/0301314 A1* | 10/2017 | Kim | G06F 3/0443 |
| 2017/0337904 A1 | 11/2017 | Du | |
| 2017/0352647 A1 | 12/2017 | Raymond et al. | |
| 2018/0033356 A1 | 2/2018 | Zhou et al. | |
| 2020/0342805 A1 | 10/2020 | Li et al. | |

FOREIGN PATENT DOCUMENTS

| | | |
|---|---|---|
| CN | 104464620 A | 3/2015 |
| CN | 104537975 A | 4/2015 |
| CN | 105869555 A | 8/2016 |
| CN | 106920502 A | 7/2017 |
| CN | 107277419 A | 10/2017 |
| CN | 107305452 A | 10/2017 |
| CN | 107808627 A | 3/2018 |
| CN | 109725701 A | 5/2019 |
| JP | 2005309066 A | 11/2005 |

OTHER PUBLICATIONS

Second Office Action dated Sep. 25, 2020, relating to CN Patent Application No. 201910001482.5.
Third Office Action dated Dec. 30, 2020, relating to CN Patent Application No. 201910001482.5.

* cited by examiner

DISPLAY PANEL AND DEVICE, IMAGE PROCESSING METHOD AND DEVICE, AND VIRTUAL REALITY SYSTEM

CROSS-REFERENCE TO RELATED APPLICATIONS

The present application is a U.S. National Stage Application under 35 U.S.C. § 371 of International Patent Application No. PCT/CN2019/127831, filed on Dec. 24, 2019, which is based on and claims priority to China Patent Application No. 201910001482.5 filed on Jan. 2, 2019, the disclosures of both of which are incorporated by reference herein in their entirety.

TECHNICAL FIELD

The present disclosure relates to a display panel and device, an image processing method and device, and a virtual reality system.

BACKGROUND

In a virtual reality system (VR), under normal circumstances, human eyes may clearly observe a screen within a range of a gaze zone, for example, a screen displayed in an intermediate display area of a display area of a display panel. However, a screen beyond the gaze zone of human eyes, for example, a screen displayed in a peripheral display area surrounding the intermediate display area may have a reduced definition.

In the related art, sub-pixels in a display panel for a virtual reality system are evenly distributed. That is, the sub-pixels per unit area in the entire display area are consistent.

SUMMARY

According to one aspect of the embodiments of the present disclosure, provided is a display panel, comprising: a first display area; and at least one second display area surrounding the first display area, wherein a number of sub-pixels per unit area in the first display area is greater than a number of sub-pixels per unit area in the at least one second display area.

In some embodiments, the display panel further comprises a plurality of gate lines and a plurality of sub-pixels, a same row of sub-pixels of the plurality of sub-pixels being connected to a same gate line of the plurality of gate lines. The plurality of gate lines comprises: a plurality of first gate lines overlapping with the first display area, wherein adjacent first gate lines of the plurality of first gate lines is of a first distance; and a plurality of second gate lines overlapping with the second display area and not overlapping with the first display area, wherein adjacent second gate lines of the plurality of second gate lines is of a second distance greater than the first distance.

In some embodiments, the display panel further comprises a plurality of data lines and a plurality of sub-pixels, a same column of sub-pixels of the plurality of sub-pixels being connected to a same data line of the plurality of data lines. The plurality of data lines comprises: a plurality of first data lines overlapping with the first display area, wherein adjacent first data lines of the plurality of first data lines is of a third distance; and a plurality of second data lines overlapping with the second display area and not overlapping with the first display area, wherein adjacent second data lines of the plurality of second data lines is of a fourth distance greater than the third distance.

In some embodiments, the at least one second display area comprises a plurality of second display areas, and the number of sub-pixels per unit area in the first display area is greater than a number of sub-pixels per unit area in each of the plurality of second display areas.

In some embodiments, the closer one of the plurality of second display areas is to the first display area, the greater the number of sub-pixels per unit area in the one of the plurality of second display areas.

In some embodiments, the first display area is in a shape of rectangle and the second display area is in a shape of rectangular ring.

In some embodiments, a number of the plurality of second display areas is two or three.

According to another aspect of the embodiments of the present disclosure, provided is a display device, comprising the display panel according to any one of the above embodiments.

According to a further aspect of the embodiments of the present disclosure, provided is an image processing method, comprising: dividing an image to be processed into a plurality of image areas comprising a first image area and at least one second image area surrounding the first image area, wherein the first image area corresponds to the first display area in the display panel according to any one of the above embodiments, and the at least one second image area corresponds to the at least one second display area in the display panel in one-to-one correspondence; rendering the plurality of image areas to make a plurality of pixels in the first image area correspond to a plurality of sub-pixels in the first display area in one-to-one correspondence, and make a plurality of pixels in each of the at least one second image area correspond to a plurality of sub-pixels in a corresponding second display area of the at least one second display area in one-to-one correspondence; stitching the rendered plurality of image areas into an image to be displayed; and transmitting image data corresponding to the image to be displayed to a driving circuit for driving the display panel.

In some embodiments, the image to be processed is obtained by inversely distorting an image captured by a camera in a virtual reality system.

In some embodiments, each of the at least one second image area comprises: a first sub-image area; a second sub-image area disposed opposite to the first sub-image area; a third sub-image area adjacent to the first sub-image area and the second sub-image area; and a fourth sub-image area disposed opposite to the third sub-image area, and adjacent to the first sub-image area and the second sub-image area.

In some embodiments, the image data comprises multi-color data and gray-scale values.

According to still another aspect of the embodiments of the present disclosure, provided is an image processing device, comprising: a dividing module configured to divide an image to be processed into a plurality of image areas comprising a first image area and at least one second image area surrounding the first image area, wherein the first image area corresponds to the first display area in the display panel according to any one of the above embodiments, and the at least one second image area corresponds to the at least one second display area in the display panel in one-to-one correspondence; a rendering module configured to render the plurality of image areas to make a plurality of pixels in the first image area correspond to a plurality of sub-pixels in the first display area in one-to-one correspondence, and make a plurality of pixels in each of the at least one second image area correspond to a plurality of sub-pixels in a corresponding second display area of the at least one second display area in one-to-one correspondence; a stitching module configured to stitch the rendered plurality of image areas into an image to be displayed; and a transmission module configured to transmit image data corresponding to the image to be displayed to a driving circuit for driving the display panel.

According to still further aspect of the embodiments of the present disclosure, provided is an image processing device, comprising: a memory; and a processor coupled to the memory and configured to perform the image processing method according to any one of the above embodiments based on instructions stored in the memory.

According to yet still further aspect of the embodiments of the present disclosure, provided is a virtual reality system, comprising at least one of the display device according to above embodiments or the image processing device according to any one of the above embodiments.

According to yet still another aspect of the embodiments of the present disclosure, provided is a computer-readable storage medium storing computer program instructions, which when executed by a processor, implement the image processing method according to any one of above embodiments.

Other features, aspects and advantages of the present disclosure will become apparent from the following detailed description of exemplary embodiments of the present disclosure with reference to the accompanying drawings.

BRIEF DESCRIPTION OF THE DRAWINGS

The accompanying drawings, which constitute part of this specification, illustrate exemplary embodiments of the present disclosure and, together with this specification, serve to explain the principles of the present disclosure. In the accompanying drawings.

It should be understood that the dimensions of the various parts shown in the accompanying drawings are not drawn according to the actual scale. In addition, the same or similar reference signs are used to denote the same or similar components.

DETAILED DESCRIPTION

Various exemplary embodiments of the present disclosure will now be described in detail with reference to the accompanying drawings. The following description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps, material composition, numerical expressions, and numerical values set forth in these embodiments, unless specifically stated otherwise, should be explained as merely illustrative, and not as a limitation.

The use of the terms "first", "second" and similar words in the present disclosure do not denote any order, quantity or importance, but are merely used to distinguish between different parts. A word such as "comprise", "have" or variants thereof means that the element before the word covers the element(s) listed after the word without excluding the possibility of also covering other elements. The terms "up", "down", or the like are used only to represent a relative positional relationship, and the relative positional relationship may be changed correspondingly if the absolute position of the described object changes.

In the present disclosure, when it is described that a specific component is disposed between a first component and a second component, there may be an intervening component between the specific component and the first component or between the specific component and the second component. When it is described that a specific part is connected to other parts, the specific part may be directly connected to the other parts without an intervening part, or not directly connected to the other parts with an intervening part.

Unless otherwise defined, all terms (including technical and scientific terms) used herein have the same meanings as the meanings commonly understood by one of ordinary skill in the art to which the present disclosure belongs. It should also be understood that terms as defined in general dictionaries, unless explicitly defined herein, should be interpreted as having meanings that are consistent with their meanings in the context of the relevant art, and not to be interpreted in an idealized or extremely formalized sense.

Techniques, methods, and apparatus known to those of ordinary skill in the relevant art may not be discussed in detail, but where appropriate, these techniques, methods, and apparatuses should be considered as part of this specification.

The inventors have noticed that, in a scenario where human eyes do not clearly capture a screen displayed in a peripheral display area, all the sub-pixels in the peripheral display area still need to be lit under drive of a driving circuit. This results in high power consumption of the display panel.

With the development of virtual reality technology, the display panel for a virtual reality system has an increasing resolution. Therefore, the distribution of sub-pixels in the peripheral display area is also denser and denser, which results in an increasing power consumption of the display panel.

In order to solve the above problem, the embodiments of the present disclosure provide the following technical solutions.

Figure 1:
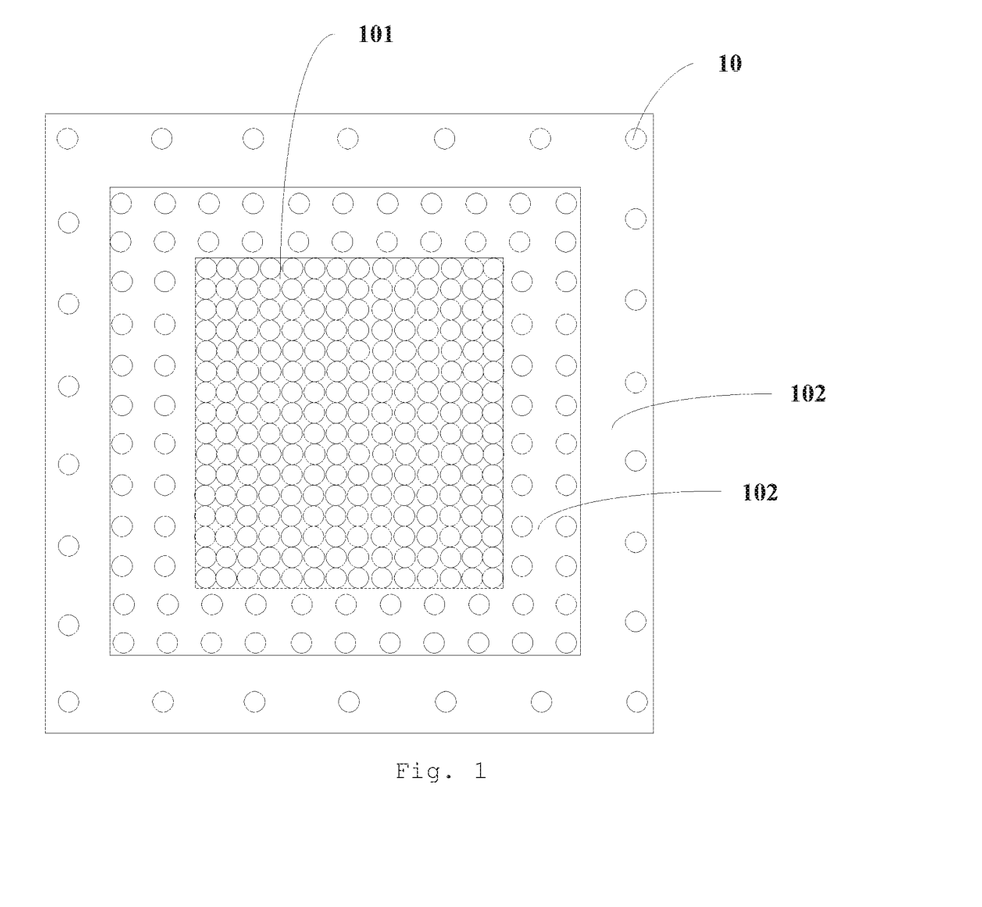
FIG. 1 is a schematic structure view showing a display panel according to an embodiment of the present disclosure.

FIG. 1 is a schematic structure view showing a display panel according to an embodiment of the present disclosure.

As shown in FIG. 1, the display panel may comprise a first display area 101 and at least one second display area 102 surrounding the first display area 101. Here, two second display areas 102 are schematically shown in FIG. 1. It should be understood that the second display area 102 farther from the first display area 101 surrounds the second display area 102 closer to the first display area 101.

Each of the first display area 101 and the second display area 102 comprises a plurality of sub-pixels 10. The number of sub-pixels in the first display area 101 per unit area is greater than the number of sub-pixels in the second display area 102 per unit area. In other words, compared to the second display area 102, the distribution of the sub-pixels 10 in the first display area 101 is denser.

In some embodiments, the first display area 101 is in a shape of rectangular. In some embodiments, the second display area 102 is in a shape of rectangular ring.

In the above embodiments, the number of sub-pixels in the first display area per unit area is greater than the number of sub-pixels in the second display area per unit area. Compared with uniform distribution of sub-pixels in the entire display area of the display panel, such a display panel consumes less power without affecting the display effect of virtual reality.

In some embodiments, the display panel may comprise one second display area 102. In this case, the number of sub-pixels in the first display area 101 per unit area is greater than the number of sub-pixels in this second display area 102 per unit area.

In other embodiments, the display panel may comprise a plurality of second display areas 102.

In some implementations, the number of sub-pixels in the first display area 101 per unit area is greater than the number of sub-pixels in some second display areas 102 per unit area, and equal to the number of sub-pixels in other second display areas 102 per unit area.

In other implementations, the number of sub-pixels in the first display area 101 per unit area is greater than the number of sub-pixels in each second display area 102 per unit area.

In some embodiments, in a case where the number of sub-pixels in the first display area 101 per unit area is greater than the number of sub-pixels in each second display area 102 per unit area, the closer a second display area 102 of the plurality of second display areas 102 is to the first display area 101, the larger the number of sub-pixels per unit area in the second display areas 102. In some embodiments, the number of the plurality of second display areas 102 is two or three, so that the display effect and the manufacturing cost may be balanced at the same time.

For example, referring to FIG. 1, the display panel comprises two second display areas 102. In the two second display areas 102, one second display area 102 relatively closer to the first display area 101 has a denser distribution of sub-pixels 10 than the other second display area 102.

In the above embodiments, the number of sub-pixels in the second display area per unit area is smaller and smaller in a direction from close to the first display area to away from the first display area. Such a display panel has better display effect with reduced power consumption.

Figure 2:
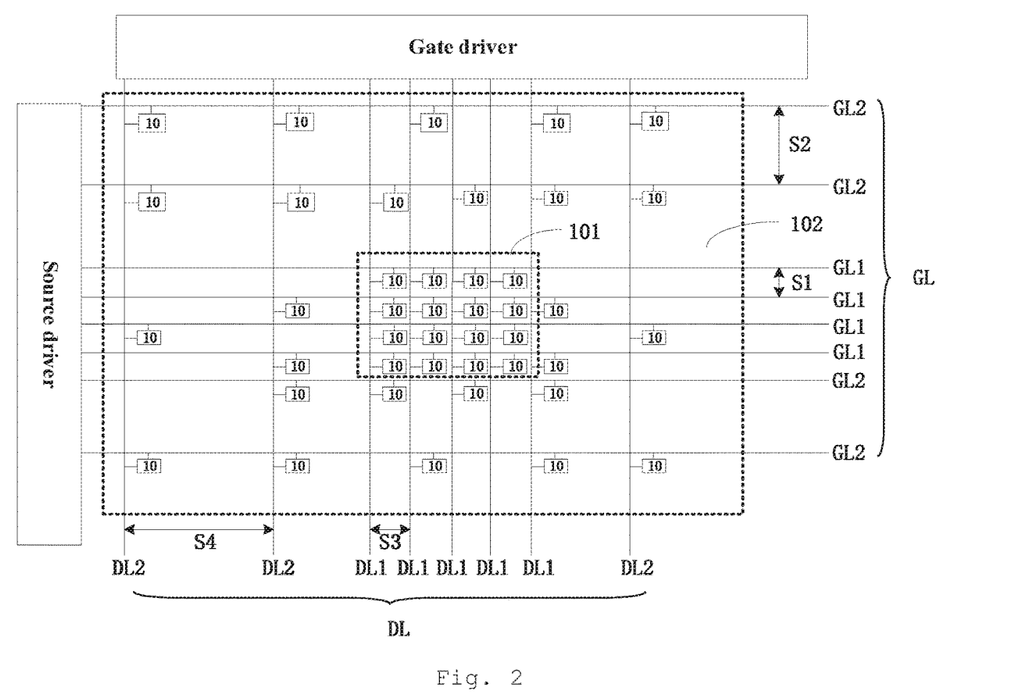
FIG. 2 is a schematic structure view showing a display panel according to another embodiment of the present disclosure.

FIG. 2 is a schematic structure view showing a display panel according to another embodiment of the present disclosure.

As shown in FIG. 2, the display panel comprises a plurality of gate lines GL, a plurality of data lines DL, and a plurality of sub-pixels 10. For the sake of clarity, FIG. 2 also shows a gate driver and a source driver in the display panel.

As can be seen from FIG. 2, a same row of sub-pixels 10 are connected to a same gate line GL, and a same column of sub-pixels 10 are connected to a same data line DL.

FIG. 2 shows the first display area 101 and one second display area 102. As shown in FIG. 2, compared to the first display area 101, the second display area 102 has a sparser distribution of sub-pixels 10.

In some embodiments, referring to FIG. 2, the plurality of gate lines GL comprises a plurality of first gate lines GL1 and a plurality of second gate lines GL2. Here, the plurality of first gate lines GL1 overlaps with the first display area 101, and the plurality of second gate lines GL2 overlaps with the second display area 102 and does not overlap with the first display area 101. Adjacent first gate lines GL1 is of a first distance S1, and adjacent second gate lines GL2 is of a second distance S2 greater than the first distance S1. In such embodiments, compared to the first display area 101, the second display area 102 has a sparser distribution of gate lines GL.

In other embodiments, referring to FIG. 2, the plurality of data lines DL comprises a plurality of first data lines DL1 and a plurality of second data lines DL2. Here, the plurality of first data lines DL1 overlaps with the first display area 101, and the plurality of second data lines DL2 overlaps with the second display area 102 and does not overlap with the first display area 101. Adjacent first data lines DL1 is of a third distance S3, and adjacent second data lines DL2 is of a fourth distance S4 greater than the third distance S3. In such embodiment, compared to the first display area, the second display area 102 has a sparser distribution of data lines DL.

Compared with uniform distribution of sub-pixels in the entire display area, the number of at least one of the plurality of gate lines GL or the plurality of data lines DL in the display panel of the above embodiments is less. Thus, the manufacturing cost of the display panel is lower, and the power consumption of the display panel is lower.

The embodiments of the present disclosure also provide an image processing method suitable for the display panel provided by any one of the above embodiments, which will be described in conjunction with FIGS. 3 and 4.

Figure 3:
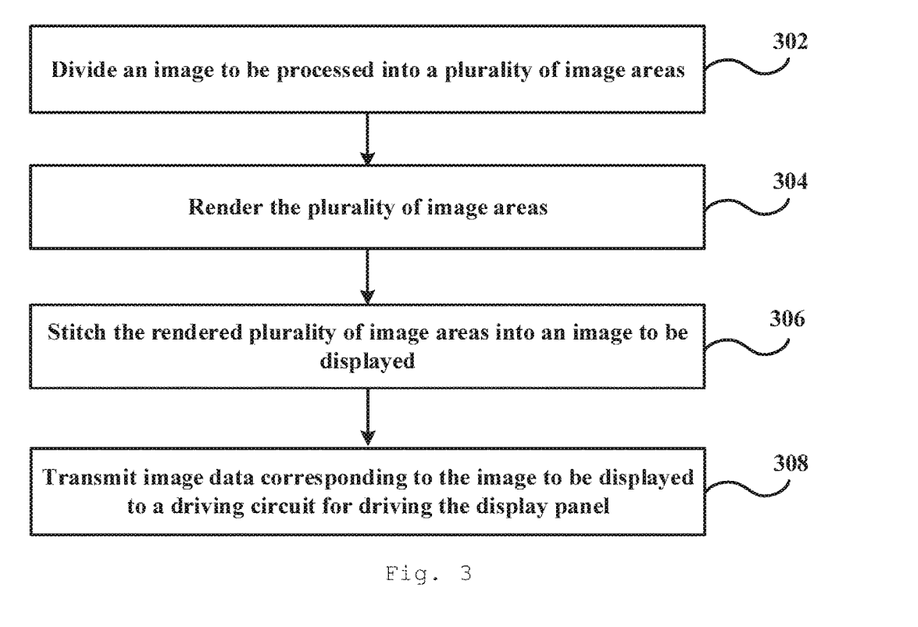
FIG. 3 is a schematic flowchart showing an image processing method according to an embodiment of the present disclosure.

FIG. 3 is a schematic flowchart showing an image processing method according to an embodiment of the present disclosure.

At step 302, an image to be processed is divided into a plurality of image areas.

Figure 4:
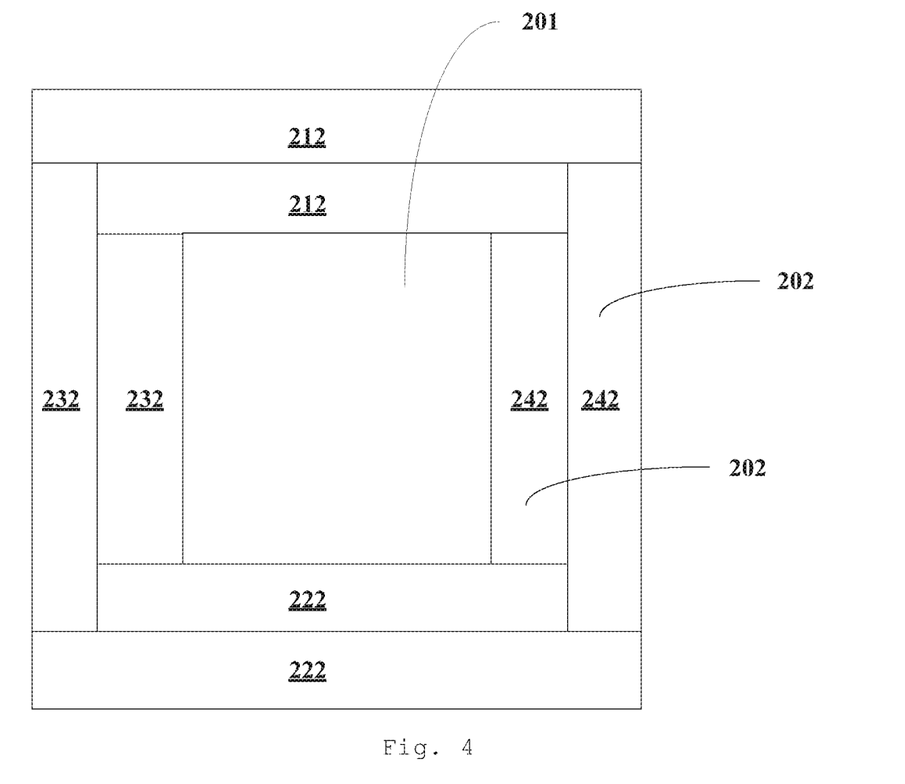
FIG. 4 is a schematic view showing a plurality of image areas according to an implementation of the present disclosure.

FIG. 4 is a schematic view showing a plurality of image areas according to an implementation of the present disclosure. As shown in FIG. 4, the plurality of image areas comprises a first image area 201 and at least one second image area 202 surrounding the first image area 201.

Here, the first image area 201 corresponds to the first display area 101 in the display panel of any one of the above embodiments, and the at least one second image area 202 corresponds to the at least one second display area 102 in the display panel. It should be noted that there is a one-to-one correspondence between the at least one second image area 202 and the at least one second display area 102, that is, one second image area 202 corresponds to one second display area 102.

In some embodiments, the image to be processed may be, for example, obtained by inversely distorting an image captured by a camera in a virtual reality system. Here, the image captured by the camera corresponds to a Euler angle representing a current posture of the virtual reality system.

At step 304, the plurality of image areas is rendered to make a plurality of pixels in the first image area 201 correspond to a plurality of sub-pixels in the first display area 101 in one-to-one correspondence. Moreover, the plurality of image areas is rendered to further make a plurality of pixels in each second image area 202 correspond to a plurality of sub-pixels in a corresponding second display area 102 in one-to-one correspondence.

It may be understood that, after the plurality of image areas is rendered, image data corresponding to each pixel in each image area may be used to drive a corresponding sub-pixel to emit light.

For ease of rendering, referring to FIG. 4, each second image area 202 may be divided into at least four sub-image areas. In some embodiments, each second image area 202 comprises a first sub-image area 212 and a second sub-image area 222 arranged oppositely, and a third sub-image area 232 and a fourth sub-image area 242 arranged oppositely. The third sub-image area 232 is adjacent to the first sub-image area 212 and the second sub-image area 222. Similarly, the fourth sub-image area 242 is adjacent to the first sub-image area 212 and the second sub-image area 222.

In some embodiments, in order to further facilitate rendering, each sub-image area may be in a shape of rectangular. In some embodiments, when the plurality of image areas is rendered, the first image area 201 and each sub-image area in each second image area 202 may be rendered simultaneously.

At step 306, the rendered plurality of image areas is stitched into an image to be displayed.

It should be understood that in the case where each second image area 202 comprises at least four sub-image areas, the first image area 201 and each sub-image area in each second image area 202 may be stitched into an image to be displayed.

At step 308, image data corresponding to the image to be displayed is transmitted to a driving circuit for driving the display panel.

It should be understood that the image data corresponding to the image to be displayed comprises image data corresponding to each pixel in the image to be displayed. Here, the image data may comprise multi-color data (for example, red-green-blue (RGB) data) and gray-scale values.

In the above embodiments, the image to be processed is divided into a plurality of image areas corresponding to a plurality of display areas of the display panel. Moreover, after the plurality of image areas is rendered, the pixels in an image area after being rendered correspond to sub-pixels in a corresponding display area in one-to-one correspondence. In this manner, the number of the pixels processed in the second image area may be reduced, and the rendering efficiency may be improved. Moreover, the transmission amount of the image data may be reduced, thereby saving a bandwidth for transmission of the image data.

In addition, after receiving the image data corresponding to the image to be displayed, the driving circuit generates a data signal according to the image data corresponding to each pixel, and transmits the generated data signal to a corresponding sub-pixel by the source driver in the driving circuit, such that the corresponding sub-pixel will be driven to emit light. The driving circuit does not need to perform additional processing such as stretching operation on the image to be displayed.

Figure 5:
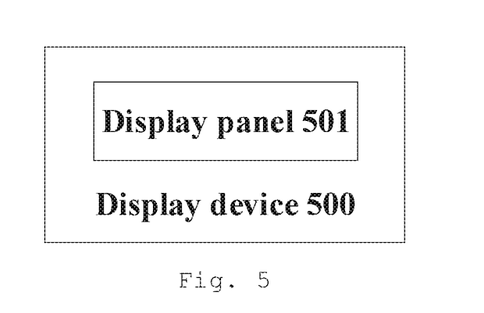
FIG. 5 is a schematic structure view showing a display device according to an embodiment of the present disclosure.

FIG. 5 is a schematic structure view showing a display device according to an embodiment of the present disclosure.

As shown in FIG. 5, the display device 500 may comprise the display panel 501 of any one of the above embodiments. In some embodiments, the display device 500 may be, for example, any product or member having a display function, such as a mobile terminal, a television, a display, a notebook computer, a digital photo frame, a navigator, or an electronic paper. For example, the display device 500 may be a display for a virtual reality system.

Figure 6:
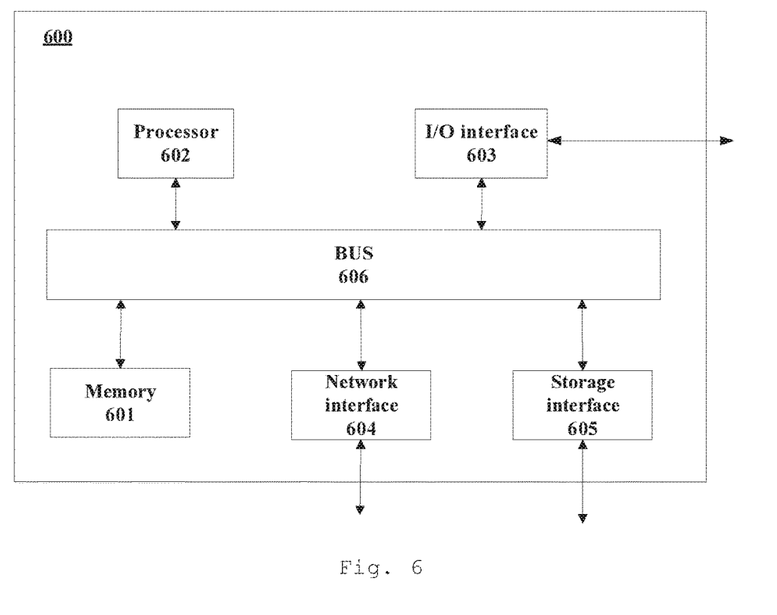
FIG. 6 is a schematic structure view showing an image processing device according to an embodiment of the present disclosure.

FIG. 6 is a schematic structural view showing an image processing device according to an embodiment of the present disclosure.

As shown in FIG. 6, the image processing device 600 comprises a memory 601 and a processor 602 coupled to the memory 601. The processor 602 is configured to perform the image processing method of any one of the foregoing embodiments based on instructions stored in the memory 601.

The memory 601 may comprise, for example, a system memory, a fixed non-volatile storage medium, or the like. The system memory may store, for example, an operation system, an application program, a boot loader, and other programs.

The image processing device 600 may further comprise an input/output interface 603, a network interface 604, a storage interface 605, or the like. These interfaces 603, 604, 605 therebetween as well as the memory 601 and the processor 602 therebetween may be connected, for example, via a bus 606. The input/output interface 603 provides a connection interface for input/output devices such as a display, a mouse, a keyboard, or a touch screen. The network interface 604 provides a connection interface for various networking devices. The storage interface 605 provides a connection interface for an external storage device such as an SD card or a USB flash disk.

Figure 7:
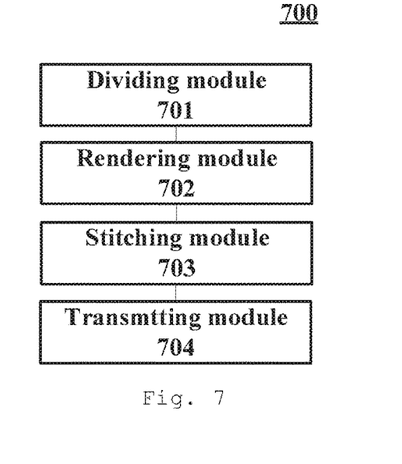
FIG. 7 is a schematic structure view showing an image processing device according to another embodiment of the present disclosure.

FIG. 7 is a schematic structure view showing an image processing device according to another embodiment of the present disclosure.

As shown in FIG. 7, the image processing device 700 comprises a dividing module 701, a rendering module 702, a stitching module 703, and a transmitting module 704.

The dividing module 701 is configured to divide the image to be processed into a plurality of image areas. The plurality of image areas comprises a first image area and at least one second image area surrounding the first image area. The first image area corresponds to the first display area in the display panel provided in any of the above embodiments, and the at least one second image area corresponds to at least one second display area in the display panel. Moreover, one second image area corresponds to one second display area.

The rendering module 702 is configured to render a plurality of image areas make a plurality of pixels in the first image area correspond to a plurality of sub-pixels in the first display area in one-to-one correspondence, and make a plurality of pixels in each of the at least one second image area correspond to a plurality of sub-pixels in a corresponding second display area of the at least one second display area in one-to-one correspondence.

The stitching module 703 is configured to stitch the plurality of image areas after being rendered into an image to be displayed.

The transmitting module 704 is configured to transmit the image data corresponding to the image to be displayed to a driving circuit for driving the display panel.

In the above embodiments, the image to be processed is divided into a plurality of image areas corresponding to a plurality of display areas of the display panel by the image processing device. Moreover, after the plurality of image areas is rendered, the pixels in an image area after being rendered correspond to sub-pixels in a corresponding display area in one-to-one correspondence. In this manner, the number of the pixels processed in the second image area may be reduced, and the rendering efficiency may be improved. Moreover, the transmission amount of the image data may be reduced, thereby saving a bandwidth for transmission of the image data.

Figure 8:
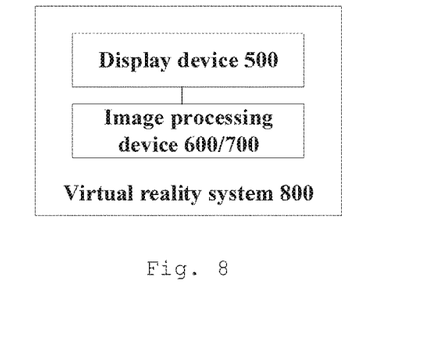
FIG. 8 is a schematic structure view showing a virtual reality system according to an embodiment of the present disclosure.

FIG. 8 is a schematic structure view showing a virtual reality system according to an embodiment of the present disclosure.

As shown in FIG. 8, the virtual reality system 800 comprises at least one of the display device 500 provided by any one of the above embodiments or the image processing device provided by any of the above embodiments (for example, the image processing device 600 or the image processing device 700).

The embodiments of the present disclosure also provide a computer-readable storage medium stored therein with computer program instructions, which when executed by a processor implement the image processing method according to any one of the above embodiments.

One skilled in the art should understand that, the embodiments of the present disclosure may be provided as a method, a device, or a computer program product. Therefore, embodiments of the present disclosure can take the form of an entirely hardware embodiment, an entirely software embodiment or an embodiment combining both hardware and software. Moreover, the present disclosure may take the form of a computer program product embodied on one or more computer-usable non-transitory storage media (including but not limited to disk storage, CD-ROM, optical memory, etc.) having computer-usable program code embodied therein.

The present disclosure is described with reference to flowcharts and/or block diagrams of methods, devices (systems) and computer program products according to embodiments of the present disclosure. It should be understood that each process in the flowcharts and/or the functions specified in one or more blocks of the block diagrams may be implemented by computer program instructions. The computer program instructions may be provided to a processor of a general purpose computer, a special purpose computer, an embedded processor, or other programmable data processing device to generate a machine, making the instructions executed by a processor of a computer or other programmable data processing device generate means implementing the functions specified in one or more flows of the flowcharts and/or one or more blocks of the block diagrams.

The computer program instructions may also be stored in a computer readable memory device capable of directing a computer or other programmable data processing device to operate in a specific manner such that the instructions stored in the computer readable memory device produce an article of manufacture including an instruction means implementing the functions specified in one or more flows of the flowcharts and/or one or more blocks of the block diagrams.

These computer program instructions can also be loaded onto a computer or other programmable device to perform a series of operation steps on the computer or other programmable device to generate a computer-implemented process such that the instructions executed on the computer or other programmable device provide steps implementing the functions specified in one or more flows of the flowcharts and/or one or more blocks of the block diagrams.

Hereto, various embodiments of the present disclosure have been described in detail. Some details well known in the art are not described to avoid obscuring the concept of the present disclosure. According to the above description, those skilled in the art would fully know how to implement the technical solutions disclosed herein.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments and equivalently substitution of part of the technical features can be made without departing from the scope and spirit of the present disclosure. The scope of the disclosure is defined by the following claims.

What is claimed is:

1. A display panel, comprising:
    a first display area; and
    at least one second display area surrounding the first display area, wherein a number of sub-pixels per unit area in the first display area is greater than a number of sub-pixels per unit area in the at least one second display area;
    the display panel further comprising a plurality of gate lines and a plurality of sub-pixels, a same row of sub-pixels of the plurality of sub-pixels being connected to a same gate line of the plurality of gate lines,
    wherein the plurality of gate lines comprises:
        a plurality of first gate lines overlapping with the first display area, wherein adjacent first gate lines of the plurality of first gate lines is of a first distance, and
        a plurality of second gate lines overlapping with the at least one second display area and not overlapping with the first display area, wherein adjacent second gate lines of the plurality of second gate lines is of a second distance greater than the first distance.

2. The display panel according to claim 1, further comprising a plurality of data lines, a same column of sub-pixels of the plurality of sub-pixels being connected to a same data line of the plurality of data lines,
    wherein the plurality of data lines comprises:
        a plurality of first data lines overlapping with the first display area, wherein adjacent first data lines of the plurality of first data lines is of a third distance, and
        a plurality of second data lines overlapping with the at least one second display area and not overlapping with the first display area, wherein adjacent second data lines of the plurality of second data lines is of a fourth distance greater than the third distance.

3. The display panel according to claim 1, wherein the at least one second display area comprises a plurality of second display areas, and the number of sub-pixels per unit area in the first display area is greater than a number of sub-pixels per unit area in each of the plurality of second display areas.

4. The display panel according to claim 3, wherein the closer one of the plurality of second display areas is to the first display area, the greater the number of sub-pixels per unit area in the one of the plurality of second display areas.

5. The display panel according to claim 3, wherein a number of the plurality of second display areas is two or three.

6. The display panel according to claim 1, wherein the first display area is in a shape of rectangle and the at least one second display area is in a shape of rectangular ring.

7. A display device, comprising the display panel according to claim 1.

8. An image processing method, comprising:
    dividing an image to be processed into a plurality of image areas comprising a first image area and at least one second image area surrounding the first image area, wherein the first image area corresponds to a first display area in a display panel, the at least one second image area corresponds to at least one second display area in the display panel in one-to-one correspondence, and a number of sub-pixels per unit area in the first display area is greater than a number of sub-pixels per unit area in the at least one second display area;

rendering the plurality of image areas to make a plurality of pixels in the first image area correspond to a plurality of sub-pixels in the first display area in one-to-one correspondence, and make a plurality of pixels in each of the at least one second image area correspond to a plurality of sub-pixels in a corresponding second display area of the at least one second display area in one-to-one correspondence;

stitching the rendered plurality of image areas into an image to be displayed; and transmitting image data corresponding to the image to be displayed to a driving circuit for driving the display panel.

9. The image processing method according to claim 8, wherein the image to be processed is obtained by inversely distorting an image captured by a camera in a virtual reality system.

10. The image processing method according to claim 8, wherein each of the at least one second image area comprises:
a first sub-image area;
a second sub-image area disposed opposite to the first sub-image area;
a third sub-image area adjacent to the first sub-image area and the second sub-image area; and
a fourth sub-image area disposed opposite to the third sub-image area, and adjacent to the first sub-image area and the second sub-image area.

11. The image processing method according to claim 8, wherein the image data comprises multi-color data and gray-scale values.

12. A non-transitory computer-readable storage medium storing computer program instructions, which when executed by a processor, implement the image processing method according to claim 8.

13. An image processing device, comprising:
a memory; and
a processor coupled to the memory and configured to perform an image processing method based on instructions stored in the memory, the image processing method comprising:
dividing an image to be processed into a plurality of image areas comprising a first image area and at least one second image area surrounding the first image area, wherein the first image area corresponds to a first display area in a display panel, the at least one second image area corresponds to at least one second display area in the display panel in one-to-one correspondence, and a number of sub-pixels per unit area in the first display area is greater than a number of sub-pixels per unit area in the at least one second display area,
rendering the plurality of image areas to make a plurality of pixels in the first image area correspond to a plurality of sub-pixels in the first display area in one-to-one correspondence, and make a plurality of pixels in each of the at least one second image area correspond to a plurality of sub-pixels in a corresponding second display area of the at least one second display area in one-to-one correspondence,
stitching the rendered plurality of image areas into an image to be displayed, and
transmitting image data corresponding to the image to be displayed to a driving circuit for driving the display panel.

14. A virtual reality system, comprising at least one of a display device or the image processing device according to claim 13, the display device comprising a display panel comprising:
a first display area; and
at least one second display area surrounding the first display area, wherein a number of sub-pixels per unit area in the first display area is greater than a number of sub-pixels per unit area in the at least one second display area.

15. The virtual reality system according to claim 14, wherein the display panel further comprises a plurality of gate lines and a plurality of sub-pixels, a same row of sub-pixels of the plurality of sub-pixels being connected to a same gate line of the plurality of gate lines; and
wherein the plurality of gate lines comprises:
a plurality of first gate lines overlapping with the first display area, wherein adjacent first gate lines of the plurality of first gate lines is of a first distance, and
a plurality of second gate lines overlapping with the at least one second display area and not overlapping with the first display area, wherein adjacent second gate lines of the plurality of second gate lines is of a second distance greater than the first distance.

16. The virtual reality system according to claim 14, wherein the display panel further comprises a plurality of data lines and a plurality of sub-pixels, a same column of sub-pixels of the plurality of sub-pixels being connected to a same data line of the plurality of data lines; and
wherein the plurality of data lines comprises:
a plurality of first data lines overlapping with the first display area, wherein adjacent first data lines of the plurality of first data lines is of a third distance, and
a plurality of second data lines overlapping with the at least one second display area and not overlapping with the first display area, wherein adjacent second data lines of the plurality of second data lines is of a fourth distance greater than the third distance.

17. The virtual reality system according to claim 14, wherein the at least one second display area comprises a plurality of second display areas, and the number of sub-pixels per unit area in the first display area is greater than a number of sub-pixels per unit area in each of the plurality of second display areas.

18. The virtual reality system according to claim 17, wherein the closer one of the plurality of second display areas is to the first display area, the greater the number of sub-pixels per unit area in the one of the plurality of second display areas.

19. The image processing device according to claim 13, wherein each of the at least one second image area comprises:
a first sub-image area;
a second sub-image area disposed opposite to the first sub-image area;
a third sub-image area adjacent to the first sub-image area and the second sub-image area; and a fourth sub-image area disposed opposite to the third sub-image area, and adjacent to the first sub-image area and the second sub-image area.

\* \* \* \* \*